United States Patent [19]

Turner et al.

[11] 4,055,726
[45] Oct. 25, 1977

[54] ELECTRICAL POSITION RESOLVING BY ZERO-CROSSING DELAY

[76] Inventors: John A. Turner, 13 Station Road, Earls Coln, Colchester, Essex; Gordon J. Ritchie, 44 Wivenhoe Road, Alresford, Colchester, Essex, both of England

[21] Appl. No.: 699,381

[22] Filed: June 24, 1976

[51] Int. Cl.² .............................................. G08C 21/00
[52] U.S. Cl. ........................................ 178/18; 178/19
[58] Field of Search ................... 340/347 NT; 178/18, 178/19

[56] References Cited

U.S. PATENT DOCUMENTS

| | | | |
|---|---|---|---|
| 3,342,935 | 9/1967 | Leifer et al. ............................. | 178/18 |
| 3,509,559 | 4/1970 | Leconte ........................ | 340/347 NT |
| 3,588,345 | 6/1971 | Dym ...................................... | 178/18 |

*Primary Examiner*—Thomas A. Robinson

*Attorney, Agent, or Firm*—Leydig, Voit, Osann, Mayer & Holt, Ltd.

[57] ABSTRACT

Position responsive apparatus is disclosed comprising a sheet of uniform resistivity having four electrodes in contact therewith around a rectangular area. One pair of parallel electrodes are respectively energized with time-delayed voltage waveforms having linearly increasing portions, and then these voltage waveforms are instead applied to the other pair of parallel electrodes; and this procedure is repeated in sequence. A movable probe makes connection with the resistive layer. The voltage waveform picked off by the probe is found to have a time delay of zero-crossing, measured relative to the zero-crossing of the waveform applied at that time to one of the two electrodes, which is dependent solely upon the position of the probe in the direction perpendicular to that electrode. In this way, the position of the probe within the rectangle defined by the electrodes can be determined.

8 Claims, 7 Drawing Figures

ELECTRICAL POSITION RESOLVING BY ZERO-CROSSING DELAY

BACKGROUND OF THE INVENTION

The invention relates to electrical position resolver arrangements, that is to say arrangements where the position of a probe relative to a surface across which the probe is movable is resolved and translated into electrical signals representative of the position of the probe.

Electrical position resolvers are known in which the surface is provided with a resistive layer to which connection is made by means of electrodes arranged around the periphery of the layer, there being four electrodes arranged in two pairs of parallel electrodes with the electrodes of one pair being perpendicular to those of the other.

It is known to produce across one or both pairs of the electrodes a uniform potential gradient and a voltage signal may be picked off by the movable probe to provide a signal amplitude that is indicative of the position of the probe. However such devices, utilising direct contact, can suffer from the disadvantage that contact resistance at the probe tip results in inaccurate indications of the position of the probe and, in the case of capacitive coupling, variations in the distance of the probe from the resistive layer (variations produced, for example, by the non-uniformity of thickness of the insulating layer normally provided over the resistive layer to protect the latter) will adversely affect accuracy due to signal amplitude variations.

Position resolving devices which do not suffer from these defects are also known, in which phase gradients are established across a uniform resistive layer by applying to opposite edges of the resistive layer alternating voltage signals of the same frequency but with a predetermined phase relationship between the signals. A probe which is movable with respect to the layer provides a signal, the phase of which is indicative of the position of the probe. With such a position resolving arrangement, the relationship between the phase of the signal at the probe and the position of the probe is non-linear when the alternating voltages applied to the edges of the resistive layer are of one frequency and essentially sinusoidal in waveform.

Further, it is usual in such systems employing sinusoidal waveforms to use circuits made resonant at the sinusoidal frequency in order to enhance the desired signal compared with any undesired noise signals which may be present. However, a considerable disadvantage when employing resonant circuits is the transient response time of amplitude or phase or amplitude and phase which results whenever the amplitude or phase is changed discontinuously.

It is an object of the invention to provide an improved electrical position resolver arrangement.

BRIEF SUMMARY OF THE INVENTION

According to the invention, there is provided an electrical position resolver arrangement, comprising means defining a resistive surface, at least two electrode means each in electrical contact with the surface at points extending respectively along spaced-apart lines, a movable probe for making electrical connection with the surface at a point between the said lines, first and second sources respectively providing first and second voltages having substantially similar voltage/time waveforms which are separated by a predetermined time delay and each of which has at least a portion which is substantially linear, connection means for respectively connecting the first and second voltages to two said electrode means, and output means responsive to the voltage produced on the probe by the first and second voltages for determining the time delay between a datum value on the linear portion of one of the first and second voltages and the corresponding datum value of the probe voltage, so as to sense the position of the probe relative to the two electrode means to which the first and second voltages are applied.

According to the invention, there is also provided an electrical position resolver arrangement, comprising means defining a surface having substantially uniform electrical resistivity, first and second electrode means making discrete electrical contact with the surface at points respectively extending along two spaced-apart parallel lines, third and fourth electrode means making discrete electrical contact with the surface at points respectively extending along two spaced-apart substantially parallel lines, the four said lines being arranged to define a rectangular area on the said surface, a movable probe for making electrical connection with the surface at a point in the said rectangular area, first and second voltage sources respectively producing first and second voltages having substantially similar voltage/time waveforms each having a portion which is substantially linear, first and second switchable connection means for connecting the first and second voltages to the first and second electrode means respectively with a predetermined time delay between their waveforms, third and fourth switchable connection means for connecting the first and second voltage sources to the third and fourth electrode means respectively with the said predetermined time delay between their waveforms, control means connected to the connection means for switching them between conductive and non-conductive conditions in pairs whereby when the first and second connection means are both conductive the third and fourth connection means are both non-conductive and vice versa, and output means connected to the probe for sensing the probe voltage and for measuring the time delay between a datum value on the linear portion of the waveform of the first voltage and the corresponding datum value of the voltage/time waveform of the probe voltage whereby to sense the distance between the instantaneous position of the probe and the electrode means to which the first voltage is at that time applied.

BRIEF DESCRIPTION OF THE DRAWINGS

An electrical position resolver embodying the invention will now be described, by way of example only, with reference to the accompanying drawings in which.

DESCRIPTION OF PREFERRED EMBODIMENTS

Figure 3:
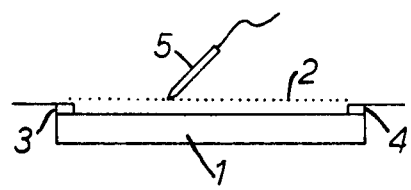
FIG. 3 is a diagrammatic end view, of a simplified form of the resolver.
Figure 2:
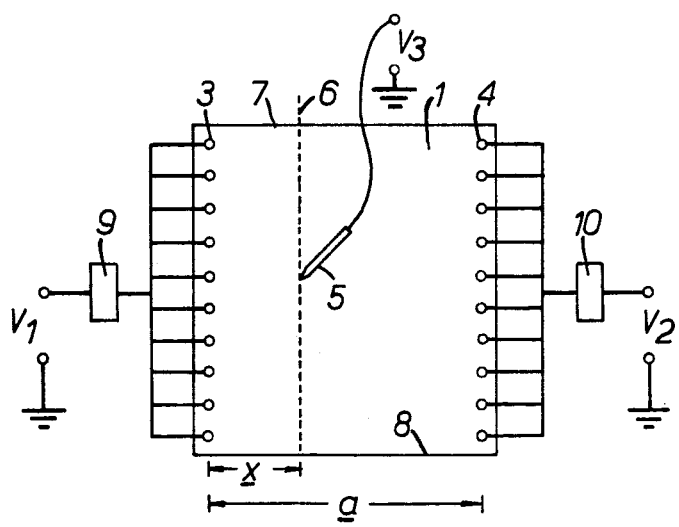
FIG. 2 is a diagrammatic plan view.
Figure 4:
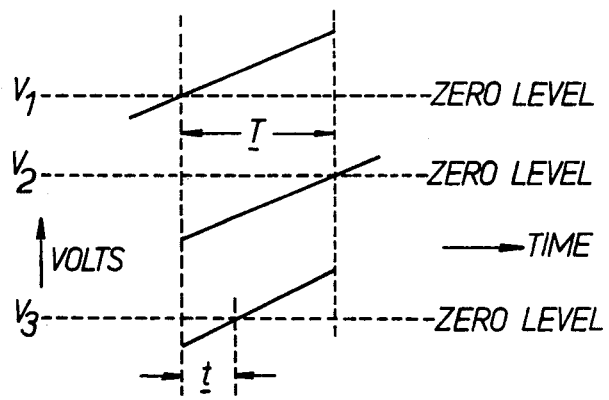
FIG. 4 shows voltage waveforms associated with the resolver of FIGS. 2 and 3.

Referring to FIGS. 2, 3 and 4, a layer 1 of uniformly resistive material is covered over and protected by a hard insulating layer 2, which is not shown in FIG. 2 but represented in FIG. 3 by the dotted line. Connection to the layer of resistive material is made by two groups of high conductivity dot contacts thereby forming parallel electrodes 3 and 4 lying along opposite sides of the layer 1. Linearly changing voltage waveforms, $V_1$ and $V_2$, shown in FIG. 4, are applied to electrodes 3 and 4 respectively via compensating networks 9 and 10. The time displacement between the waveforms $V_1$ and $V_2$ is time T. A probe 5 is movable over the layer 2 making capacitative coupling with the resistive layer 1 through the layer 2 at whatever position the probe may occupy. The output of the probe is a voltage waveform $V_3$, consisting of proportions of $V_1$ and $V_2$, which is also shown in FIG. 4. The time of zero-crossing of voltage waveform $V_3$ is displaced from the time of zero-crossing of voltage waveform $V_1$ by a time interval $t$. If the probe 5 is tracked along a line 6 which is parallel to both the electrodes 3 and 4, then it can be shown both experimentally and theoretically that the time delay of zero-crossing of voltage waveform $V_3$ is constant and that $t = x\,T/a$ where $x$ is the perpendicular distance from electrode 3 of the point at which the voltage waveform $V_3$ was measured and $a$ is the total separation of the electrodes 3 and 4.

Figure 1:
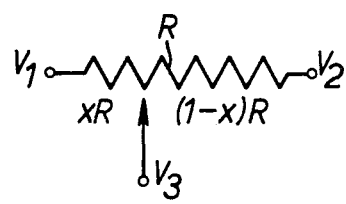
FIG. 1 is a schematic representation of the equivalent circuit of the resolver.

Thus referring to FIG. 1, R represents the resistance of the uniform resistivity layer 1 measured between opposite edge electrodes 3, 4. Voltage waveforms $V_1$ and $V_2$ respectively are applied as shown. $V_3$ represents the voltage waveform sensed by the probe at a horizontal distance x measured from the electrode to which $V_1$ is applied.

From the above circuit it is evident that $$V_3 = V_1(1-x) + V_2 x \quad (1)$$

Voltage waveforms $V_1$ and $V_2$ are linearly increasing with time ($t$) and are mathematically described by the following Equations:

$$V_1 = kt \quad (2)$$

and $$V_2 = k(t-T) \quad (3);$$

where $k$ is the slope of each waveform measured in volts per second, and $T$ is the time displacement between voltage waveforms $V_1$ and $V_2$.

Combining Equations (1), (2) and (3), $$V_3 = kt(1-x) + kx(t-T)$$
$$= k(t-xT)$$

Defining $V_3$ as zero when $t = t_o$, then $$t_o = xT$$

Therefore, provided T is constant, the time delay of zerocrossing (measured as $t_o$) of $V_3$ is linearly proportional to horizontal probe position (measured as $x$). Thus, referring back to FIGS. 2 to 4, the time delay $t$ is proportional to the distance $x$.

It is apparent that if a second pair of electrodes, also formed from dot contacts, is provided along the edges 7 and 8 of the resistive layer 1 with electrodes 3 and 4 disconnected, then similarly an indication of the position of probe 5 perpendicular to these further electrodes can be obtained. However, the indications of the X and Y coordinate positions can only be obtained sequentially and not simultaneously. Such a construction will be described with reference to FIGS. 5 and 6.

Figure 5:
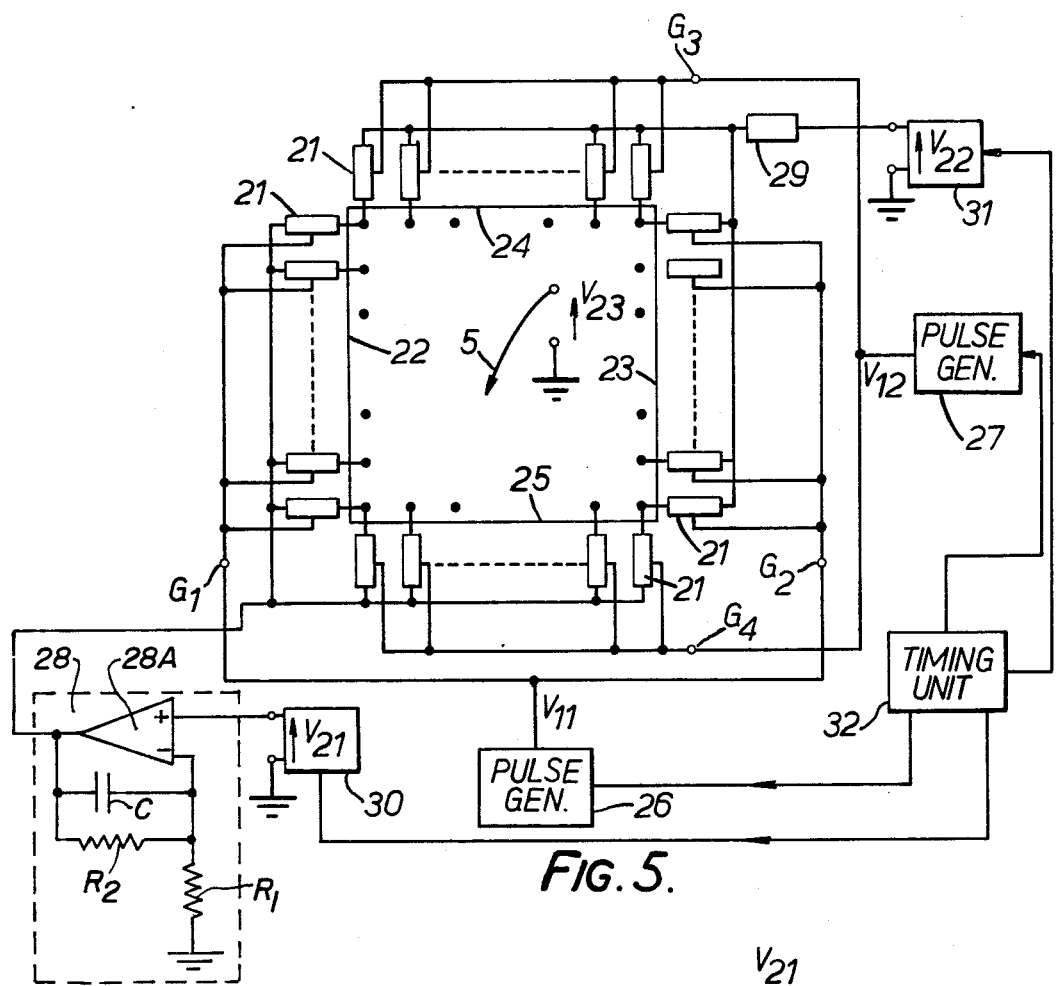
FIG. 5 is a plan view of another form of the resolver showing its schematic circuit diagram.
Figure 6:
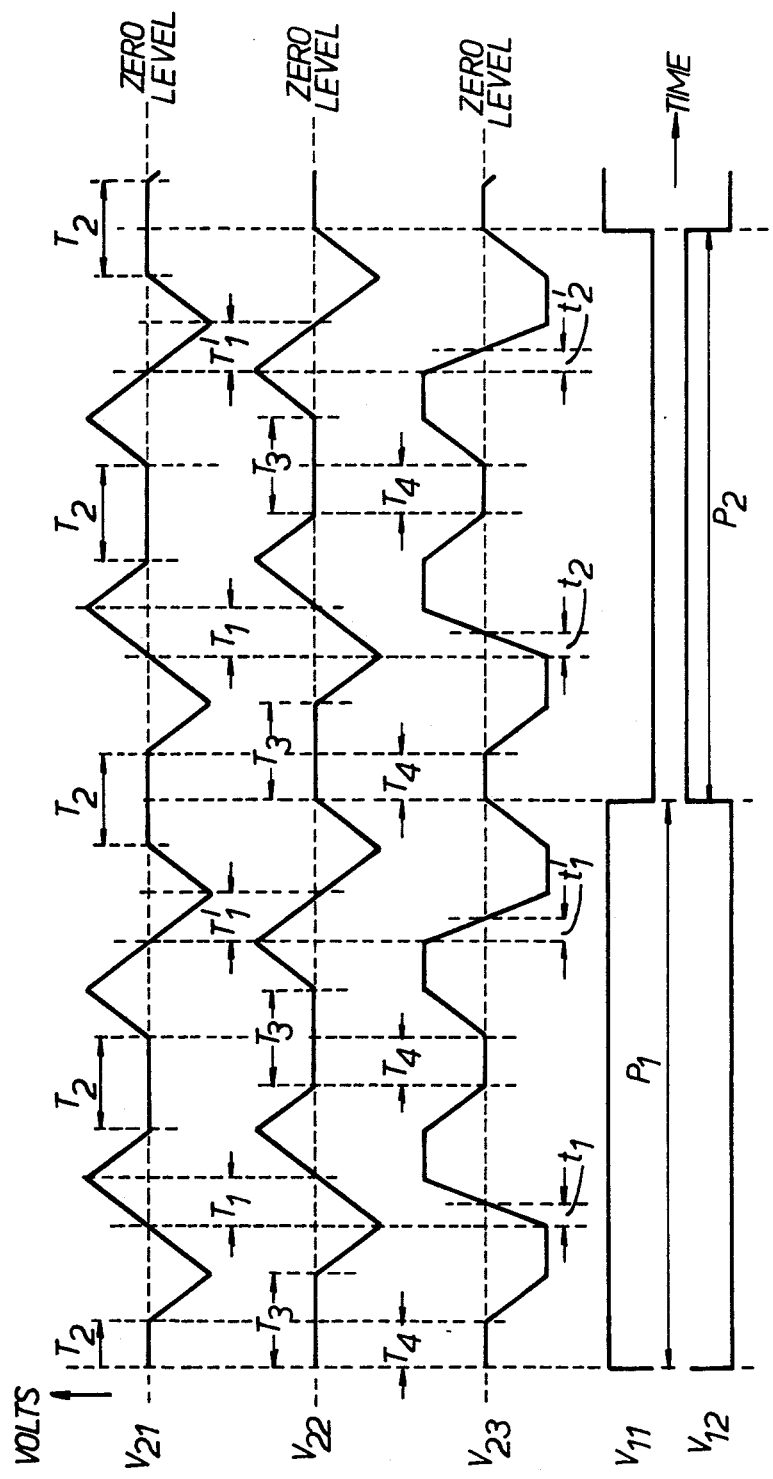
FIG. 6 shows voltage waveforms associated with the resolver of FIG. 5 during operation.

Referring to FIGS. 5 and 6, there is provided a group of substantially identical semiconductor switches 21 connected to individual dot contacts so as to form four electrode means 22, 23, 24 and 25 respectively effectively distributed along the edges of the resistive layer 1. For each of the electrode means 22 to 25, one terminal of each switch is connected to a common point, and the other switch terminals are individually connected to a series of dot contacts uniformly spaced along the respective edges of the layer 1. The conduction of the switches 21 forming the electrode means 22, 23, 24 and 25 is controlled by the gating voltages $V_{11}$ and $V_{12}$, which are respectively applied to switch gating terminals $G_1$ and $G_2$ and to switch gating terminals $G_3$, $G_4$. The voltage waveforms $V_{11}$ and $V_{12}$ shown in FIG. 6 are generated by pulse generators 26 and 27 respectively.

The switches 21 control the connection of voltage sources 30 and 31 to the two pairs of parallel electrode means 22, 23 and 24, 25. The sources 30 and 31 produce voltages $V_{21}$ and $V_{22}$ respectively. These voltages are shown in FIG. 6 and are substantially identical (comprising linearly increasing and linearly decreasing portions and constant portions) but timedisplaced with reference to each other.

In use, the probe 5 is moved over the resistive layer and the switches 21 are rendered conducting and non-conducting, in a sequence to be described, by the gating voltages $V_{11}$ and $V_{12}$. A voltage $V_{23}$ is picked off by the probe 5.

During a period $P_1$ (FIG. 6), the switches 21 forming the pair of electrode means 22, 23 are rendered conducting and connect these electrode means to the voltage waveforms $V_{21}$ and $V_{22}$ respectively via compensating networks 28 and 29 (to be described in detail below) respectively, while the switches forming the pair of electrode means 24, 25 are held non-conducting. During a period $P_2$, the switches 21 forming the pair of electrode means 24, 25 are rendered conducting and connect these electrode means to the voltage waveforms $V_{21}$ and $V_{22}$ respectively via compensating networks 28 and 29 respectively, while the switches forming the pair of electrode means 22, 23 are held non-conducting.

In similar manner to that explained in connection with FIGS. 2 to 4, the voltage waveform ($V_{23}$) picked off by the probe 5 will depend on the components, at the probe position, of the waveforms $V_{21}$ and $V_{22}$ and is shown in FIG. 6.

Thus, for example, during an interval $T_1$ in period $P_1$, the voltage waveforms $V_{21}$ and $V_{22}$ are both linearly increasing. The time delay of zero-crossing $t_1$ of the voltage waveform $V_{23}$ at the probe 5 relative to the zero-crossing of voltage waveform $V_{21}$ is therefore proportional to the horizontal position, that is the distance of the probe 5 from the electrode means 22.

During period $P_2$, the time delay $T_1$ corresponds with that of period $P_1$, but the time delay $t_2$ is now proportional to the vertical position of the probe 5, that is the distance of the probe from the electrode means 25.

As shown in FIG. 6, the voltage waveforms $V_{21}$ and $V_{22}$ remain at a constant level during periods of time $T_2$ and $T_3$ respectively. The time overlap of periods $T_2$ and $T_3$ is designated $T_4$. During $T_4$ the signal $V_{23}$ sensed by the probe 5 is at a constant level and at that time may be electronically restored to a reference voltage of known potential, for example zero potential. The time of zero-crossing of voltage waveform $V_{23}$ is defined as the instant when the voltage waveform $V_{23}$ passes through this reference voltage. Incorporation of this feature renders the device substantially immune to the effects of slowly varying electrical noise signals (caused for example by the proximity of adjacent 50 Hz power cables) in the electronic circuitry.

Variations of quiescent voltage levels within the electronic circuitry (caused for example by fluctuations of temperature and aging of components) and slowly varying electrical noise signals picked up by the probe 5 induce errors in the time of zero-crossing of voltage waveform $V_{23}$. As shown in FIG. 6, in addition to the periods $T_1$ during which the voltage waveforms $V_{21}$ and $V_{22}$ are both linearly increasing, there are provided periods $T_1'$ during which the voltage waveforms $V_{21}$ and $V_{22}$ are both linearly decreasing. The time delays of zero-crossing $t_1'$ and $t_2'$ of voltage waveform $V_{23}$ during the periods $T_1'$ are also proportional to the horizontal and vertical positions respectively of the probe 5. If the arithmetic means or averages of the pairs of time delays $t_1, t_1'$ and $t_2, t_2'$ are individually determined, these averaged quantities, denoting horizontal and vertical positions respectively of the probe 5, are substantially independent of the variations of quiescent voltage levels and slowly varying electrical noise signals within the electronic circuitry.

As explained, the manner in which the time delay of zero-crossing of voltage waveform $V_{23}$ varies relative to the zero-crossing of voltage waveform $V_{21}$ is a function of the position of the probe 5. The linearity of this variation is dependent upon the extent to which the switches 21 associated with the electrode means 22 to 25 are identical while they are conducting, the number of switched connections to each edge of the resistive layer 1, and also the extent to which the other electrode means are unaffected by the connections to their respective nonconducting switches 21.

The compensating networks 28 and 29 in FIG. 5 respectively compensate for the effects of probe to resistive-layer capacitance which attenuates the low frequency components of the voltages $V_{21}$ and $V_{22}$. For example, in one embodiment of the invention, the probe together with its accompanying electronic circuitry has a transfer function $K_1s/(1+K_2s)$ where $K_1$ and $K_2$ are constants, and $s$ is the well known frequency dependent Laplace operator. The compensating networks 28 and 29 respectively are thus designed to have a transfer function $(1+K_2s)/K_3s$ where $K_3$ is also a constant, in order that the resultant transfer function is $K_1/K_3$. As shown in FIG. 5 the compensating network 28 may comprise an operational amplifier 28A to the + input of which is applied the voltage $V_{21}$ and whose − input is grounded through a resistor $R_1$. A shunt path is provided by a capacitor C and a high value resistor $R_2$. Ignoring $R_2$, analysis yields:

$$(V_o/V_i) = (1 + K_2s)/K_3s$$

Where $V_o$ and $V_i$ are respectively the output and input voltages of the amplifier and where $K_2 = K_3 = CR_1$. $R_2$ is introduced for DC stability reasons but its value is chosen to have negligible effect on the transfer function $(V_o/V_i)$ over the frequency range used. The compensating network 29 can be similarly constructed. In this way, the probe voltage waveform is independent of s and therefore independent of frequency thereby preserving the linear characteristics of the frequency components of $V_{21}$ and $V_{22}$ picked up by the probe. The same function is performed by the compensating networks 9 and 10 in FIG. 2, and they may be constructed similarly to the network 28. If desired, the compensating networks may be replaced by direct electrical connections.

The timing of the whole circuit, that is, of the pulse generators 26 and 27 and of the voltages $V_{21}$ and $V_{22}$, is controlled by a timing unit 32.

The time delay of zero-crossing may readily be converted to a digital position output, for example, by gating a signal at an essentially constant frequency into an electronic counting circuit for the duration of the delay interval. Such an arrangement will now be described in more detail with reference to FIG. 7.

Figure 7:
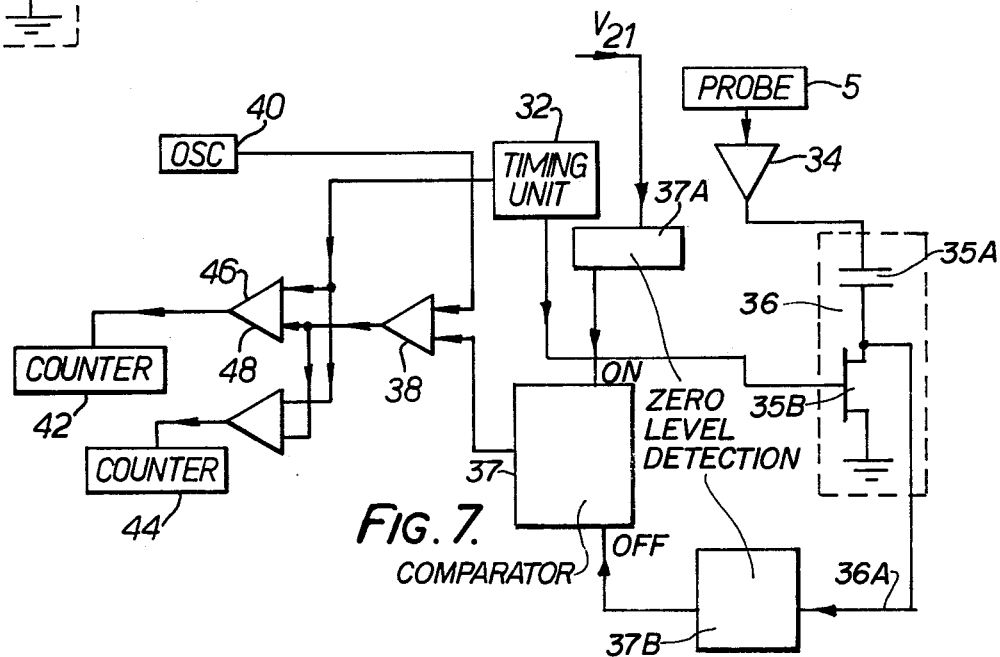
FIG. 7 is a schematic circuit diagram of output circuitry of the resolver of FIGS. 5 and 6.

As shown in FIG. 7, the voltage picked up by the probe is fed through a high input impedance buffer amplifier 34 to a switchable clamping circuit 36. Thence the signal passes to a gate 37. The gate 37 has a second input which is energised by zero level detector circuit 37B on a line 36A. A comparator 37 has an ON line which is energised by a zero level detector circuit 37A, which detects when voltage $V_{21}$ passes through zero and switches comparator 37 on at this instant. Comparator 37 also has an OFF input which is energised by the zero level detector circuit 37B, which detects when the probe voltage next reaches zero level and switches comparator 37 off at this instant. The comparator 37 thus produces output pulses correponding in length to the time periods $t_1, t_1', t_2, t_2'$. These pulses pass to a gate 38 which also receives high frequency pulses from an oscillator 40. The gate 38 thus produces bursts of high frequency pulses, each burst corresponding to a time period $t_1, t_1', t_2, t_2'$, and the number of high frequency pulses in each burst being dependent on the length of the time period.

The bursts of high frequency pulses are directed either to a counter 42 or to a counter 44 by means of gates 46 and 48. The latter gates are controlled by the timing unit 32 so that the high frequency pulses go to counter 42 when the voltages $V_{21}$ and $V_{22}$ are being applied between electrodes 22 and 23 and to counter 44 when the voltages $V_{21}$ and $V_{22}$ are being applied between electrodes 24 and 25.

In operation, the probe 5 is held in a fixed position for a time at least equal to $P_1 + P_2$ (FIG. 6) and the totals in the counters 42 and 44 are read off at the end of this time. These totals will respectively represent the x and y coordinates of the probe position (and will average out any differences in lengths of the time delays $t_1$ and $t_1'$, and $t_2$ and $t_2'$).

The clamping circuit 36 is operated from the timing unit 32 (FIG. 7) and comprises an a.c. coupled path, via a capacitor 35A which is connectable to a reference voltage level (e.g. ground) through a switching transistor in the form of a field effect transistor 35B. During each period $T_4$ (FIG. 6), the timing unit 32 energises the transistor to clamp the probe temporarily to the reference voltage level.

The switches 21 can be operated at a high frequency in order to give virtually simultaneous digital signals for both X and Y coordinates of the position of the probe 5. It will be appreciated that when the device has four electrodes which are energised in pairs, as in FIGS. 5 and 6, it is necessary that the electrodes make contact at discrete points with the resistive surface (as opposed to line contact) in order to prevent the unenergised electrodes from having a distorting effect on the field across the surface.

The device described with reference to FIGS. 5 and 6 is suited to form an electrographic tablet.

Instead of making electrical connection to the resistive layer 1 by capacitive coupling as described, the probe 5 may be arranged to make electrical connection by direct contact.

What we claim is:

1. An electrical position resolver arrangement, comprising
   means defining a resistive surface,
   at least two electrode means in electrical contact with the surface at points extending respectively along spaced-apart lines,
   a movable probe for making electrical connections with the surface at a point between the said lines,
   first and second sources respectively providing first and second voltges having substantially similar voltage/time waveforms which are separated by a predetermined time delay and each of which has at least a portion which is unmodulated and substantially linear,
   connection means for respectively connecting the first and second voltages to said two electrode means, and
   output means responsive to the voltage produced on the probe by the first and second voltages for determining the time delay between the time when the said portion of one of the first and second voltages crosses a datum value and the time when the probe voltage crosses the corresponding datum value, so as to sense the position of the probe relative to the two electrode means to which the first and second voltages are applied.

2. A resolver arrangement according to claim 1, in which the said portions of the first and second voltages are substantially linearly increasing portions and in which the first and second voltages have other unmodulated portions which decrease substantially linearly, and in which the output means comprises
   means for measuring the time delay between the time when the said unmodulated linearly increasing portion of one of the first and second voltages crosses a datum value and the time when the probe voltage crosses the corresponding datum value,
   means for measuring the time delay between the time when the said unmodulated linearly decreasing portion of one of the first and second voltages crosses a datum value and the time when the probe voltage crosses the corresponding datum value, and
   means for measuring the average of the two said time delays whereby to sense the position of the probe relative to the electrode means.

3. An electrical position resolver arrangement, comprising
   means defining a surface having substantially uniform electrical resistivity,
   first and second electrode means making discrete electrical contact with the surface at points respectively extending along two spaced-apart substantially parallel lines,
   third and fourth electrode means making discrete electrical contact with the surface at points respectively extending along two spaced-apart substantially parallel lines,
   the four said lines being arranged to define a rectangular area on the said surface,
   a movable probe for making electrical contact with the surface at a point in the said rectangular area,
   first and second voltage sources respectively producing first and second voltages having substantially similar voltage/time waveforms each having a portion which is unmodulated and substantially linear,
   first and second switchable connection means for connecting the first and second voltage sources to the first and second electrode means respectively with a predetermined time delay between their waveforms,
   third and fourth switchable connection means for connecting the first and second voltage sources to the third and fourth electrode means respectively with the said predetermined time delay between their waveforms,
   control means connected to the connection means for switching them between conductive and non-conductive conditions in pairs whereby when the first and second connection means are both conductive the third and fourth connection means are both non-conductive and vice versa, and
   output means connected to the probe for sensing the probe voltage and for measuring the time delay between the time when the linear portion of the waveform of the first voltage crosses a datum value and the time when the voltage/time waveform of the probe voltage crosses the corresponding datum value whereby to sense the distance between the instantaneous position of the probe and that one of the electrode means to which the first voltage is at that time applied.

4. A resolver arrangement according to claim 3, in which the said portions of the first and second voltages are substantially linearly increasing portions and in which the first and second voltages have other portions which are unmodulated and decrease substantially linearly; and in which the outut means comprises
   means for measuring the time delay between the time when said unmodulated linearly increasing portion of the waveform of the first voltage crosses a datum value and the time when the waveform of the probe voltage crosses the corresponding datum value,
   means for measuring the time delay between the time when said unmodulated linearly decreasing portion of the waveform of the first voltage crosses a datum value and the time when the waveform of the probe voltage crosses the corresponding datum value, and
   means for measuring the average of the two said time delays whereby to sense the position of the probe relative to the electrode means.

5. A resolver arrangement according to claim 3, in which the said voltage/time waveforms have mutually overlapping time periods during which the voltages are constant, and including means operative during the overlap portion of the time periods for clamping the probe voltage to a reference level.

6. A resolver arrangement according to claim 3, in which each said connection means includes compensating means having a predetermined transfer function which compensates for attenuating effects of capacitance between the probe and the said surface.

7. A resolver arrangement according to claim 3, in which the output means includes comparing means connected to receive and compare the first voltage and the probe voltage whereby to produce output pulses each of which has a length corresponding to the said time delay between the two said datum values of the first voltage and the probe voltage, a source of high frequency pulses, gating means connected to receive the said output pulses and the said high frequency pulses whereby to produce bursts of high frequency pulses each containing a number of high frequency pulses corresponding to the length of a respective one of the output pulses, and counting means connected to receive and count the number of high frequency pulses in at least two said bursts whereby the count produced is dependent on the distance between the probe and the electrode means to which the first voltage is at that time applied.

8. A resolver arrangement according to claim 7, in which the counting means comprises first and second counters, and in which the output means includes means connected to be controlled in synchronism with the control means to direct the bursts of high frequency pulses to the first or the second counter according to which of the said pairs of connection means is conducting, whereby the counts produced in the counters are respectively dependent on the distances between the probe and respective ones of two orthogonal ones of the electrode means.

* * * * *